Patented Feb. 15, 1927.

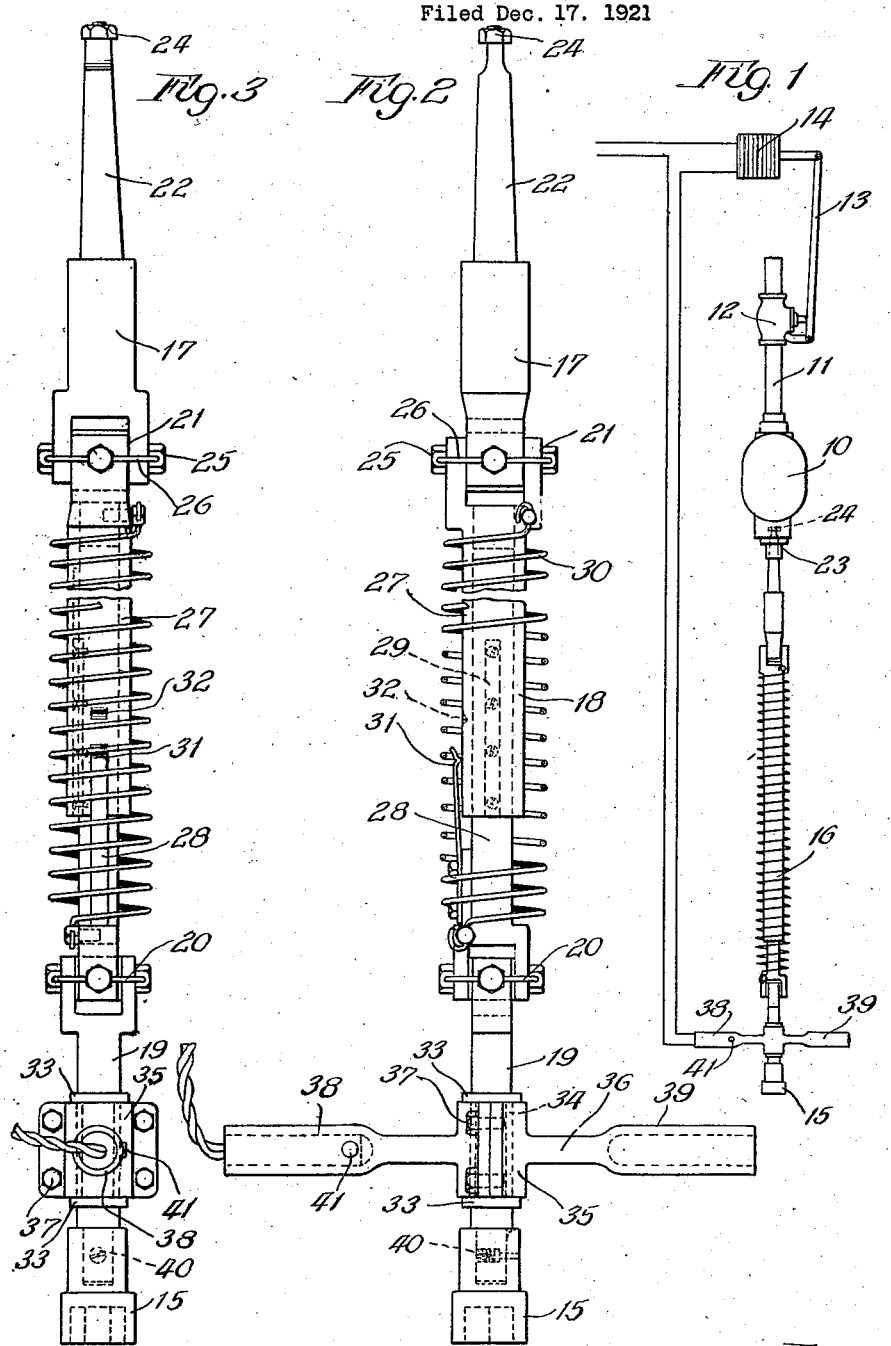

1,617,512

UNITED STATES PATENT OFFICE.

GEORGE E. RUFFNER, OF RACINE, WISCONSIN.

POWER MECHANISM FOR DRIVING TOOLS.

Application filed December 17, 1921. Serial No. 523,154.

The object of this invention is to drive tools of various kinds by suitable power, and permit them to be applied at selective angles to a direct line from the source of power, and at different distances from the source of power.

Another object of the invention is to transmit power efficiently and steadily to the tool and to afford the operator ample control of both the tool and the power.

Further objects of the invention will become apparent as the description is read in connection with the accompanying drawing showing a selected embodiment of the invention, and in which—

Fig. 1 is a diagrammatic view illustrating the assembled mechanism;

Figs. 2 and 3 are elevations on a large scale of the power transmitting devices.

Referring to Fig. 1, 10 indicates a motor here shown in the form commonly used in air drills, which is connected by a pipe 11 with a source of compressed air. A valve 12 controls the supply of air to the motor, and is in turn controlled by a lever 13 adapted to be operated by a magnet 14. 15 indicates a tool here shown as a socket wrench, and 16 indicates a power transmitting device connecting the tool with the motor 10. This device is made up of a plurality of shaft sections connected by universal joints. As illustrated there are three sections 17, 18 and 19 connected by universal joints 20 and 21. The shaft section 17 is provided with a tapered shank 22 adapted to be received in the tool holder 23 of the motor 10, and be secured therein by a nut 24. The form of this shank will, of course, be varied to suit the particular tool socket carried by the motor, and it is immaterial to the invention how the connection is made, so long as the power will be effectually transmitted to the shaft. The universal joints 20 and 21 are illustrated as being formed of a pair of forks having their arms engaging four sides of a block and secured thereto by bolts 25 which are locked by the wire 26. But any suitable form of universal joint may be used. The shaft section 18 is made in two parts, 27 and 28, the former being hollow and slidably receiving the latter. A key 29 prevents relative rotation of the parts 27 and 28, and a spring 30 having its one end secured to the part 27, and the other end to the part 28 resists the sliding movement of the two parts. This spring is of sufficient strength to hold the parts in about the position indicated in Figs. 2 and 3, but may be readily extended to permit the tool to be moved to a greater or less distance from the source of power.

The particular joint between the parts 27 and 28 of the shaft section 18 is relatively unimportant as any form of extensible shaft may be used. The part 28 is provided with a spring latch 31 adapted to catch in a socket 32 in the part 27 when the part 28 has been raised sufficiently to slightly compress the spring 30. This latch makes it possible for the operator to secure the tool in elevated position when it is not to be used and to readily disengage it for use.

The shaft section 19 is equipped with a pair of collars 33 between which is located a bushing 34 adapted to form a bearing for the hub 35 of a handle 36. As shown, the handle is made in two parts and secured together by bolts 37. I prefer to provide this handle with a pair of grips 38 and 39 so that the operator may use both hands in applying the tool or holding it during an operation. The swivel joint just described permits the grips 38 and 39 to be held stationary while the shaft section 19 is being driven. The lower end of the shaft section 19 may be equipped with any form of tool holder so as to receive the desired tools to be driven. As here shown, the socket wrench 15 is secured thereto by a screw 40.

The grip 38 is equipped with a button 41 which operates a switch in the circuit of the magnet 14. When it is desired to drive the tool 15, the operator places a finger on the button 41, energizing the magnet 14 which operates the valve 12 to admit compressed air to the motor 10. To stop the tool the pressure is removed from the button 41. If desired, another button may be provided to reverse the motion of the tool so that the tool may be driven forward or backward at will.

It is contemplated that the motor 10 will be suitably supported at a point above and adjacent to the work to be done by the tool. The shaft section 18 will be of sufficient length to provide the necessary extension to cover the range of the work or a plurality of such sections may be provided, as will be obvious. When a tool is to be used, it will be secured to the shaft section 19 and the operator will grasp the grips 38 and 39 to move the tool into proper position. The button 41 will then be pressed and the motor 10 will transmit the power for driving the tool as long as the switch is kept closed. When the operation is complete the operator may simply release the grips, whereupon the motor 10 will stop and the spring 30 will return the tool to elevated position. If the device is to be left for any considerable length of time, or if it is desired that the tool shall be at a higher elevation, the latch 31 is engaged with the socket 32 so as to contract the sliding shaft section 18 to the limit.

I am aware that changes in the form and proportion of parts, and in the details of construction of my invention may be made without departing from the spirit or sacrificing any of the advantages thereof, and I reserve the right to make all such changes as fairly fall within the scope of the following claims.

I claim:

1. In an apparatus of the character described, the combination of a tool, a source of power, means to transmit power from the source to the tool including a flexible and extensible shaft, a transversely arranged handle swiveled on said shaft adjacent to said tool, and means on the handle for controlling the source of power.

2. In an apparatus of the character described, the combination of a tool, a motor, transmission between said tool and said motor including a flexible and extensible shaft, a valve for controlling the flow of power to the motor, a magnet adapted to operate the valve, a handle swiveled on the shaft adjacent to the tool, and a switch on the handle for controlling the magnet.

3. In an apparatus of the character described, the combination of a tool, a fluid pressure motor, transmission between the motor and the tool including a flexible and extensible shaft, a fluid supply pipe connected with said motor, a valve in said pipe for controlling the fluid supply, a magnet for controlling said valve, a handle swiveled on said shaft adjacent to the tool, and a switch on said handle for controlling said magnet.

4. In a device of the class described, an extensible shaft, a universal joint at each end of said shaft, one of said joints connecting said shaft to a source of power, the other of said joints connecting said shaft to a tool, said shaft comprising a plurality of parts capable of movement relative to each other longitudinally of said shaft but at all times held against rotative movement relative to each other, resilient means holding said shaft in an extended position but resisting further extension, and means for latching said extensible shaft in retracted position against the influence of said resilient means.

GEORGE E. RUFFNER.